United States Patent [19]

Klein et al.

[11] 4,171,195

[45] Oct. 16, 1979

[54] CROSS-HEAD DIE WITH VOLUMETRIC FLOW COMPENSATION MEANS

[75] Inventors: Reuben Klein; Imrich Klein; Yigal Cidon, all of Highland Park, N.J.

[73] Assignee: Scientific Process & Research, Inc., Highland Park, N.J.

[21] Appl. No.: 852,228

[22] Filed: Nov. 17, 1977

[51] Int. Cl.² .......................................... B29D 23/04
[52] U.S. Cl. ........................... 425/141; 425/381; 425/466; 425/467
[58] Field of Search ............... 264/209; 425/141, 466, 425/381, 467, 380, 532; 72/264

[56] References Cited

U.S. PATENT DOCUMENTS

| | | | |
|---|---|---|---|
| 3,782,873 | 1/1974 | Lynnknowles | 425/141 |
| 4,038,017 | 7/1977 | Langecker | 425/466 |
| 4,047,868 | 9/1977 | Kudo et al. | 425/466 X |
| 4,097,213 | 6/1978 | McComb et al. | 425/466 X |

*Primary Examiner*—Mark Rosenbaum
*Attorney, Agent, or Firm*—Samuelson & Jacob

[57] ABSTRACT

A cross-head die in which the manifold is provided with means for selectively varying the volume of the manifold at some locations relative to other locations, whereby the relative wall thickness about the annular configuration of the material flowing through the die is selectively adjusted about the periphery of the annular configuration of flowing material. Wall thickness and configuration are further controlled at the outlet orifice of the die by means movable to selectively expand, contract and alter the annular configuration of the die passage at the orifice.

14 Claims, 13 Drawing Figures

CROSS-HEAD DIE WITH VOLUMETRIC FLOW COMPENSATION MEANS

The present invention relates generally to cross-head dies and pertains, more specifically, to apparatus wherein the volumetric flow of material through a cross-head die is selectively varied around the periphery of the die passage to provide improved control over the wall thickness and configuration of the material emerging from the die.

Cross-head dies usually are employed in conjunction with extruders to conform extruded plastic materials into an annular configuration for forming such items as plastic jackets, tubes and parisons for a variety of plastic items. Because the wall thickness of the emerging annular conformed material is dependent upon the volumetric rate of flow of the material through the cross-head die, uncontrolled irregularities in the volumetric flow will cause corresponding uncontrolled irregularities in wall thickness. In the past, attempts to correct such non-uniformities have included movement of the inner core of the die to an off-center position to correct the material flow pattern, or the use of compensating rings or sleeves which are moved axially within the annular die cavity to compensate for irregularities in the flow rate. Such devices have achieved limited success and fall short of providing the flexibility of control required to effectively deal with the problem under a wide variety of operating conditions.

It is an object of the present invention to provide for the selective control of the volumetric rate of flow of material around the periphery of a cross-head die whereby the selective variation of the volumetric rate of flow at one peripheral location in the die relative to another peripheral location enables selective adjustment of the wall thickness about the periphery of the annular configuration of the material emerging from the die.

Another object of the invention is to provide for the selective control of the overall rate of flow of material through a cross-head die to adjust the overall wall thickness of the emerging material.

Still another object of the invention is to provide for the selective control of relative wall thickness around the perimeter of the emerging material.

A further object of the invention is to provide for the selective control of the relative and overall wall thickness of the emerging material under a wide variety of operating conditions, utilizing different plastic materials.

A still further object of the invention is to provide a simplified method for the selective control of the wall thickness of material emerging from a cross-head die, enabling the use of readily fabricated apparatus which is easy to use and maintain.

The above objects, as well as still further objects and advantages, are attained by the present invention which may be described briefly as means for selectively adjusting the relative wall thickness about the perimeter of an annular configuration in material emerging from a cross-head die used in connection with an extruder to receive material from the extruder and direct the material into a downstream flow wherein the material is conformed to an annular configuration of desired wall thickness, the cross-head die including a housing, an annular die passage extending axially within the housing, the die passage having an annular inlet, and an outlet axially downstream of the inlet, an input passage in the housing, the input passage extending transverse to the direction of the die passage for receiving the material from the extruder and passing the material toward the die passage, and a manifold in the housing, the manifold communicating with the input passage and having an annular outlet juxtaposed with the annular inlet of the die passage, the manifold further having a given volume at locations along the manifold, the locations communicating with corresponding circumferential portions of the annular inlet of the die passage, the means including means operatively associated with the manifold for selectively varying the volume of the manifold at at least a first of said locations relative to a second of said locations to selectively adjust the relative flow rate of material from the manifold into the corresponding portions of the die passage, whereby the relative wall thickness is selectively adjusted about the periphery of the annular configuration. In addition, means is provided for selectively increasing and decreasing the overall wall thickness of the emerging material, and further means is provided for selectively altering the configuration of the outlet to vary the wall thickness about the periphery of the emerging material.

The invention will be more fully understood, while further objects and advantages will become apparent, in the following detailed description of preferred embodiments thereof illustrated in the accompanying drawing, in which.

Figure 1:
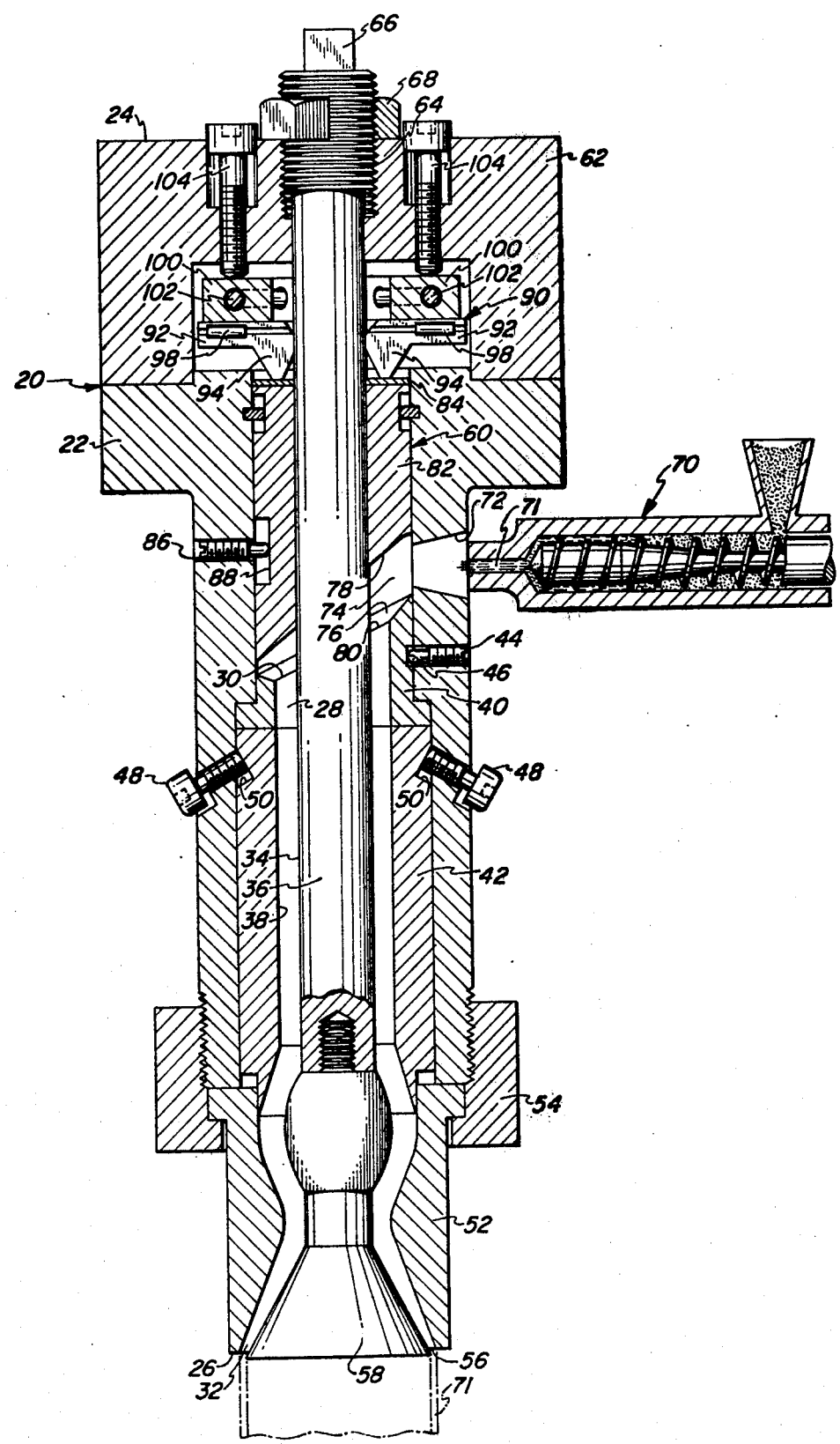
FIG. 1 is a longitudinal cross-sectional view of a cross-head die illustrating an embodiment of the invention.

Referring now to the drawing, and especially to FIG. 1 thereof, a cross-head die which illustrates the invention is shown at 20 and is seen to include a housing 22 which extends longitudinally between an upper end 24 and a lower end 26. An annular die passage 28 extends axially within the housing 22 and has an annular inlet 30 and an outlet 32 axially below, or downstream, from the inlet 30. Die passage 28 includes an inner wall 34 provided by the outer surface of a central rod 36, and an outer wall 38 established by a first sleeve 40 and a second sleeve 42. First sleeve 40 is located and secured in the housing 22 by a pin 44 threaded into the housing 22 and extending into a complementary recess 46 in the first sleeve 40. Likewise, a pair of bolts 48 are threaded into the housing 22 and each bolt 48 is received within a complementary recess 50 in the second sleeve 42 to locate and secure the second sleeve 42 in place within the housing.

A further sleeve 52 is secured to the housing 22 by a threaded collar 54 so as to become an integral part of the housing 22 and continue the outer wall 38 of die passage 28 to an annular orifice 56 at outlet 32. Inner wall 34 is continued to outlet 32 by an extension 58 attached to rod 36. Rod 36 extends upwardly through a bushing assembly 60 and is threaded through an upper cover 62 at 64. Upper cover 62 is secured to housing 22, as by threaded fasteners or the like (not shown) so as to become an integral part of the housing. A wrenching configuration 66 at the top of rod 36 enables the rod to be turned within the threads at 64 to move the rod 36 axially relative to the housing 22. Such axial movement of rod 36 enables adjustment of the area of the annular orifice 56 by virtue of the corresponding movement of extension 58 with rod 36 and the flared, frustoconical configuration of die passage 28 adjacent the orifice 56. Once the appropriate adjustment is completed, rod 36 is locked in position by a locknut 68.

Cross-head die 20 is used in connection with an extruder, shown diagrammatically and in reduced scale at 70, which delivers plasticated material 71 to an input passage 72 in the housing 22 of the cross-head die 20. The input passage 72 extends transverse to the direction of the die passage 28 and communicates with a manifold 74 in the housing 22, the manifold 74 being delineated by axially opposite first and second walls 76 and 78, respectively, provided by the first sleeve 40 and the bushing assembly 60. Manifold 74 includes an annular outlet 80 juxtaposed with the annular inlet 30 of die passage 28 so that material supplied to the manifold 74 through input passage 72 is passed into the die passage 28. In this manner, material 71 received from the extruder 70 is directed into a downstream flow and is conformed to an annular configuration as it emerges at the annular orifice 56.

While the wall thickness of the material emerging from orifice 56 may be adjusted throughout the entire periphery of the wall by axial movement of rod 36 and extension 58 to dilate and contract the annular orifice 56, as explained above, the uniformity of the wall thickness about the periphery of the emerging annular material is dependent upon a balanced volumetric rate of flow of material at all circumferential locations around the die passage 28, and the flow rate can be affected by conditions other than the relative axial location of the extension 58 and the further sleeve 52. It then becomes necessary to compensate for non-uniformities in wall thickness by changing the relative positions of the components of the cross-head die in such a way as to effect an advantageous change in the flow pattern of the material as it passes through the die passage. By enabling a selective change in the geometry of the manifold 74 which effects a change in the volume of the manifold at a first location relative to the volume at a second location circumferentially around the manifold the rate of flow of material through the manifold 74 to the inlet 30 of the die passage 28 will be varied so that the flow rate into inlet 30 at portions of the die passage corresponding to the locations along the manifold will be adjusted accordingly.

Turning now to FIGS. 2 through 7, as well as to FIG. 1, in order to enable selected variations in the volume of portions of the manifold 74, bushing assembly 60, which establishes the upper wall 78 of manifold 74, is divided into segments 82 which extend axially along bushing assembly 60. A thin, flexible annulus 84 is affixed to the top of each segment 82, as by brazing or welding, and aids in securing the segments 82 together in an annular bushing-like assembly, while enabling relative axial movement of some segments relative to others. Bushing assembly 60 is located and secured within housing 22 by a locator pin 86 threaded through the housing 22 and passing into a recess 88 in the bushing assembly 60.

Figure 6:
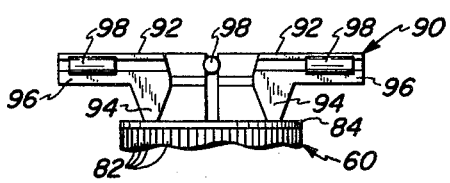
FIG. 6 is a cross-sectional view taken along line 6—6 of FIG. 5.
Figure 5:
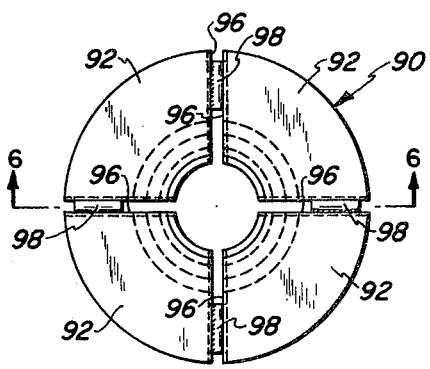
FIG. 5 is a plan view of a pressure plate arrangement in the cross-head die of FIG. 1.

A pressure plate assembly 90 rests upon the bushing assembly 60 and includes a plurality of pressure plates 92 in the form of sectors, each pressure plate 92 having a depending integral foot 94 which contacts the flexible annulus 84. As best seen in FIGS. 5 and 6, the pressure plates 92 are hinged to one another at confronting radial edges 96 by means of cylindrical hinge pins 98 which are received within a complementary cylindrical contour in each of the confronting edges 96 and are secured, as by welding, to one of the confronting edges while being journaled in the other of the confronting edges.

Turning back to FIGS. 2 and 3, a series of pressure pads 100 is placed above the pressure plates 92, with each pressure pad 100 being located circumferentially so as to straddle a pair of confronting edges 96 and rest upon adjacent pressure plates. The pressure pads 100 are held in spaced arrangement relative to one another by securement upon a ring 102 which is somewhat resilient for purposes which will now be described. A plurality of pressure screws 104 are threaded axially through the cover 62 of housing 22, each screw being placed over the hinged connection between adjacent pressure plates 92 and being urged against a corresponding pressure pad 100.

By selected advancement or retraction of each of the pressure screws 104, the pressure plates 92 are displaced downwardly or upwardly relative to one another and the displacement of the pressure plates 92 is transmitted to the segments 82 of the bushing assembly 60, through depending feet 94 and flexible annulus 84, to produce an axial sliding displacement of some segments 82 relative to others. The relative axial displacement of the segments 82 results in a change in contour in the upper wall 78 of manifold 74 and a concomitant change in volume of the manifold at the locations corresponding to the circumferential locations of the displaced segments 82. Thus, selected changes in volume of the manifold at some locations, as at 106, relative to other locations, such as at 108, are attained at any position around the perimeter of the manifold by a change in the axial length of the manifold at such positions, resulting from the displacement of portions only of upper wall 78 relative to lower wall 76 of the manifold 74. Since the volumetric flow of material into each circumferential portion of the die passage 28 is a function of the volume of the manifold 74 at the location corresponding to that circumferential portion of the die passage 28, the volumetric flow can be controlled selectively around the periphery of the die passage by selecting the appropriate axial positioning of each pressure screw 104. Control of the volumetric flow enables selective adjustment of the relative wall thickness about the periphery of the annular configuration of the material emerging from the die passage.

Figure 2:
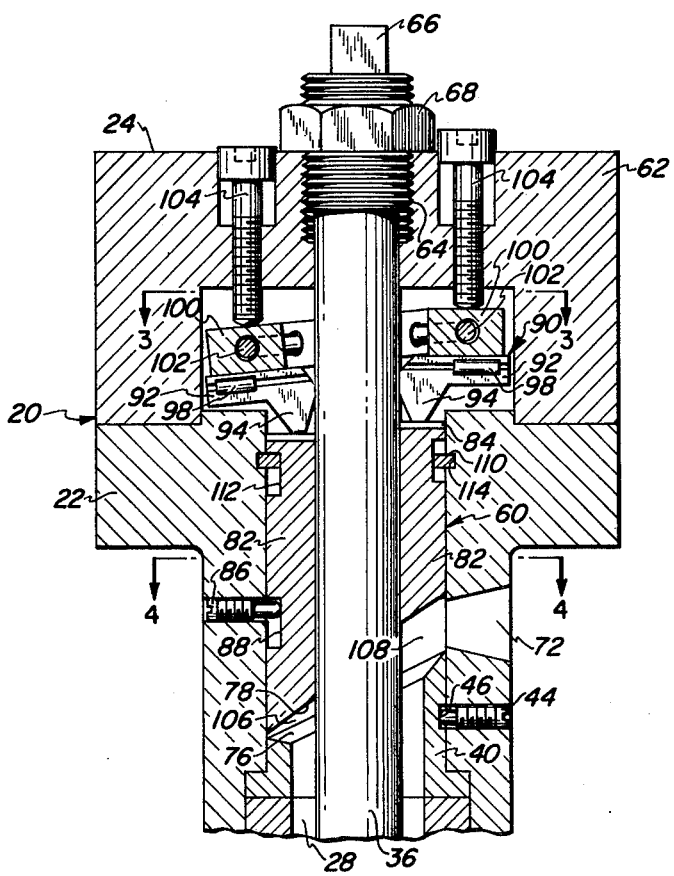
FIG. 2 is a fragmentary longitudinal cross-sectional view of a portion of the cross-head die of FIG. 1, with component parts in another operating position.
Figure 3:
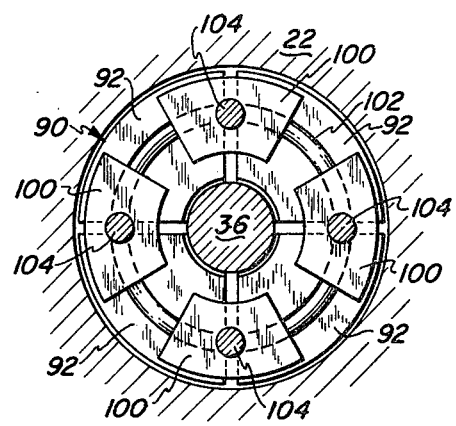
FIG. 3 is a lateral cross-sectional view taken along line 3—3 of FIG. 2.
Figure 4:
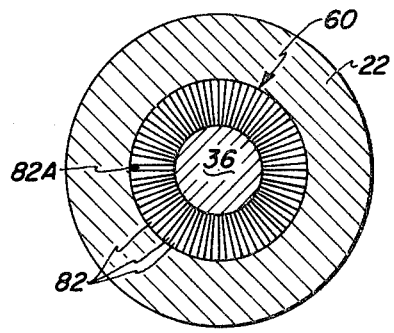
FIG. 4 is a lateral cross-sectional view taken along line 4—4 of FIG. 2.

As best seen in FIGS. 2 and 4, segments 82 preferably are relatively thin, wedge-shaped members to provide a wide latitude of adjustment in the contour of upper wall 78 of manifold 74. For ease of assembly, one of the segments 82A may be provided with a parallel-sided rather than wedge-shaped cross-sectional configuration. The maintenance of the integrity of the assembled segments 82 is aided by the provision of a band 110 which extends around the segments 82 within an annular groove 112. Band 110 is seated within a corresponding annular slot 114 in housing 22, and groove 112 has an axial length sufficient to enable the full range of axial displacement desired for segments 82. It is pointed out that the pressure of the plastic material in the manifold 74 is exerted against the upper wall 78 and tends to urge the bushing assembly 60, and all of the segments 82 thereof, upwardly while the position of the pressure screws 104 determines the relative axial positions of the segments 82 and the overall contour of the upper wall 78.

Figure 7:
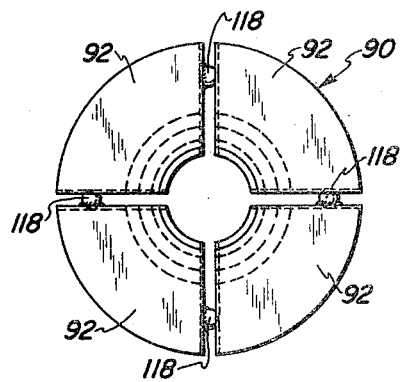
FIG. 7 is a plan view similar to FIG. 5, but showing an alternate construction.

In the alternate construction illustrated in FIG. 7, the pressure plates 92 are hinged together by spherical hinge members 118, rather than by cylindrical hinge pins, thereby providing a somewhat increased degree of flexibility by enabling a swivelling movement of the pressure plates 92 relative to one another.

Figure 8:
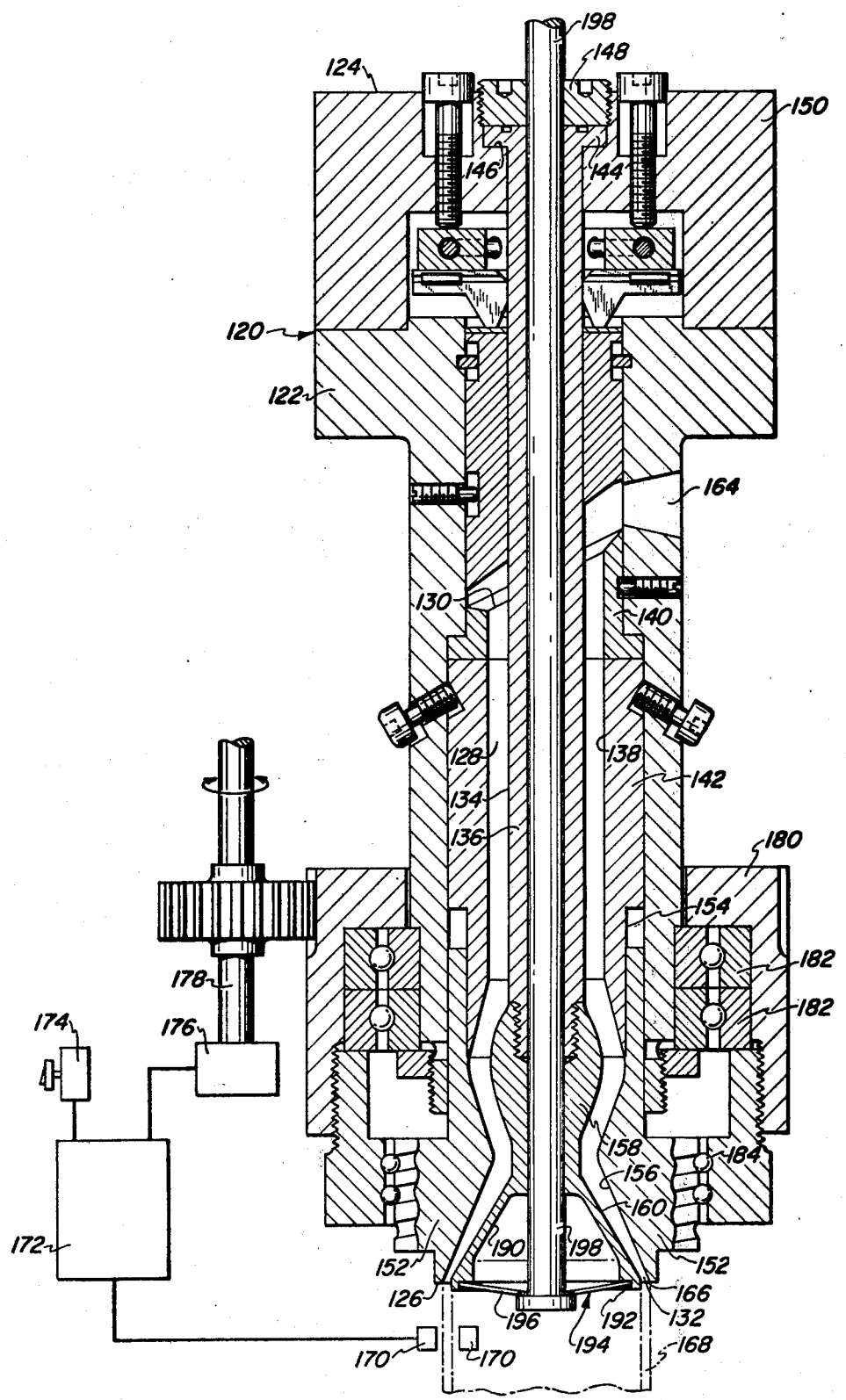
FIG. 8 is a longitudinal cross-sectional view of another cross-head die illustrating another embodiment of the invention.

Referring now to FIG. 8, another cross-head die 120 is illustrated which is similar to cross-head die 20 insofar as providing for the adjustment of the relative wall thickness around the perimeter of the emerging material by selective variation of the volumetric flow through portions of the manifold 74; however, cross-head die 120 provides for the continuous monitoring and adjustment of the overall wall thickness of the emerging material so as to maintain a selected wall thickness during operation of the device.

In this instance, housing 122 extends between upper end 124 and lower end 126 and an annular die passage 128 extends axially between an annular inlet 130 and an outlet 132. Die passage 128 includes an inner wall 134 provided by the outer surface of a central tube 136 and an outer wall 138 established by a first sleeve 140 and a second sleeve 142. Tube 136 is fixed in housing 122 by means of a flange 144 seated upon a shoulder 146 and secured in place by a threaded plug 148 in the upper cover 150 in the housing. A sleeve-like member 152 is received within an annular guide slot 154 for axial sliding movement relative to the housing 122 and second sleeve 142 and includes a surface 156 which provides the outer surface of the outlet passage portion of the die passage 128. An extension 158 is affixed to tube 136 and provides an inner surface 160 of the outlet passage portion. Both surfaces 156 and 160 have a frusto-conical configuration.

The plastic material introduced into the input passage 164 in the housing 122 emerges from the orifice 166 at outlet 132 in an annular configuration, shown diagrammatically at 168. Detector means 170 is shown diagrammatically and is located adjacent the orifice 166 for detecting the wall thickness of the emerging material 168. The information pertaining to the measured wall thickness is supplied to a computer 172. Computer 172 also receives information from a wall thickness selector 174 which enables an operator to select a desired optimum wall thickness. Computer 172 compares the information received from detector means 170 and selector 174 and, on the basis of such information, operates drive means in the form of servomotor 176 which is coupled to a drive shaft 178. Drive shaft 178 is geared to a collar 180 journalled for rotation relative to housing 122 by means of bearings 182. Collar 180 carries a ball-screw assembly 184 coupled to sleeve-like member 152 so that upon rotation of drive shaft 178 in response to operation of servomotor 176, sleeve-like member 152 is displaced axially upwardly or downwardly. Such upward and downward movement displaces surface 156 relative to surface 160 to dilate or contract the orifice 166 whereby the wall thickness of material 168 will be made thicker or thinner, as required to maintain the selected value.

In some instances, as for example in the production of parisons which will be used for blow molding articles having a non-circular cross-section, it is desirable to provide the emerging material with a wall thickness which varies in a prescribed manner around the periphery of the transverse cross-section of the emerging material. For example, a parison for blow molding a bottle with an elliptical transverse cross-sectional configuration may best be formed with a wall of greater thickness in those areas which eventually will be extended over a greater area, representing the major dimension of the elliptical cross-section, and of lesser thickness in those areas which eventually will be extended over a lesser area, representing the minor dimension of the elliptical cross-section. Cross-head die 120 enables the emerging material to be provided with such a varying wall thickness, as follows.

Figure 9:
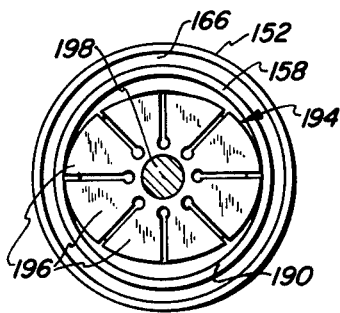
FIG. 9 is a bottom plan view of a portion of the cross-head die of FIG. 8.
Figure 10:
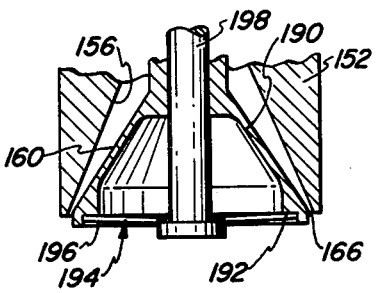
FIG. 10 is a fragmentary cross-sectional view of a portion of the cross-head die of FIG. 8, with the component parts in another operating position.

Referring now to FIGS. 8 through 10, the inner surface 160 of the outlet passage portion of die passage 128 is located along a skirt-like member 190 which is a part of extension 158. Skirt-like member 190 has a frusto-conical configuration with a relatively thin-walled, circular cross-sectional configuration. A circular slot 192 at the lowermost end of skirt-like member 190 receives a radially expandable member in the form of a dished disk 194 having radially extending fingers 196, at least some of which are always seated in slot 192. An actuator rod 198 is coupled to the center of the dished disk 194 and slides axially within central tube 136. Dished disk 194 is non-circular and some of the fingers 196 are longer than others. In the illustrated embodiment, dished disk 194 is elliptical, as viewed in FIGS. 9 and 11.

Figure 11:
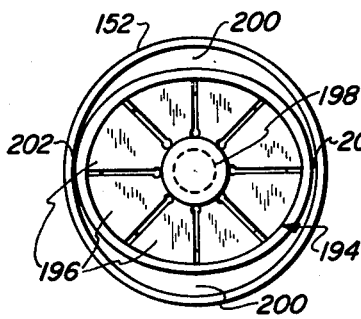
FIG. 11 is a bottom plan view similar to FIG. 9, but with the component parts in the position illustrated in FIG. 10.

Axial movement of actuator rod 198 between the position illustrated in FIGS. 8 and 9 and the position illustrated in FIGS. 10 and 11, will expand the dished disk 194 radially outwardly. Because of the non-circular configuration of the dished disk 194, such outward expansion will flex the skirt-like member 190 into a non-circular shape, as seen in FIG. 11. The difference between the non-circular shape of skirt-like member 190 and the circular shape of the surrounding sleeve-like member 152 provides orifice 166 with a non-uniform opening including radially wider portions 200 and radially narrower portions 202. These wider and narrower portions 200 and 202 provide the emerging material 168 with corresponding thicker and thinner wall portions so that the wall thickness is varied around the periphery of the emerging material.

Figure 12:
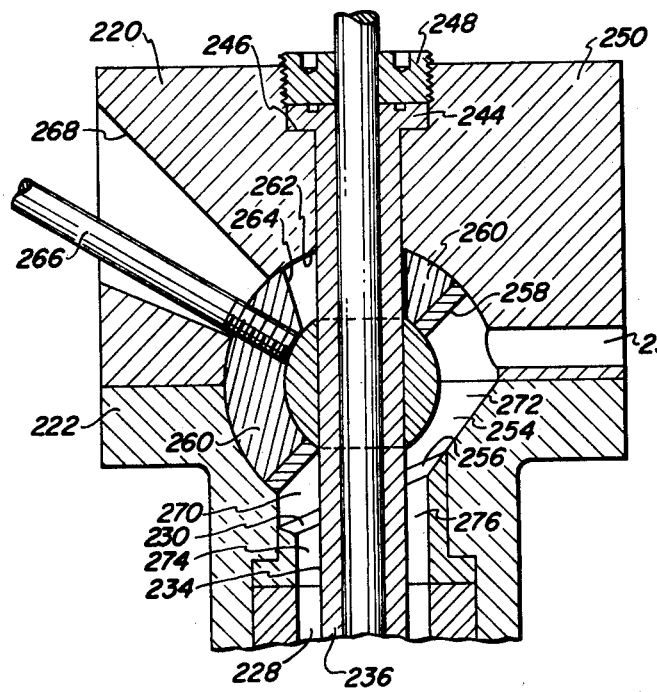
FIG. 12 is a fragmentary cross-sectional view of a cross-head die illustrating still another embodiment of the invention.
Figure 13:
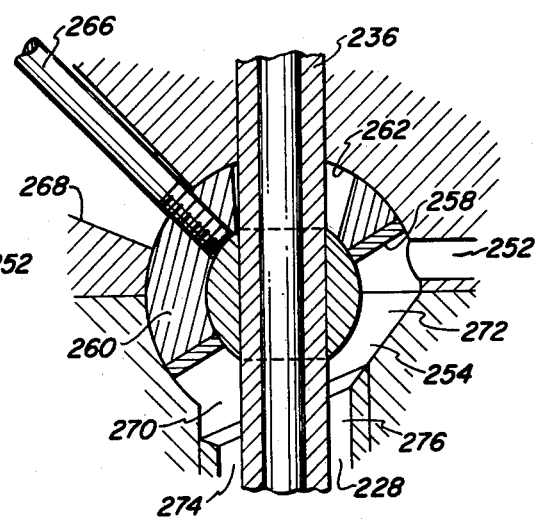
FIG. 13 is a fragmentary view illustrating certain component parts of the cross-head die of FIG. 12 in another operating position.

Turning now to FIGS. 12 and 13, a portion of cross-head die 220 is illustrated to show an alternate arrangement for varying the volume of the manifold to adjust the relative volumetric flow rate of material from the manifold into different portions of the die passage. Thus, cross-head die 220 includes a housing 222 within which there is located an axially-extending die passage 228 having an annular inlet 230 and an inner wall 234 provided by the outer surface of a central tube 236 affixed in the housing 222 by means of a flange 244 seated upon a shoulder 246 and secured in place by a threaded plug 248 in the upper cover 250 of the housing.

Plastic material is introduced into an input passage 252 and passes through a manifold 254 to be directed to the die passage 228. Manifold 254 includes a fixed lower wall 256 within which annular inlet 230 is located. The upper wall 258 of the manifold 254 is located on a semi-spherical member 260 which is mounted for swivelling movement within a complementary cavity 262 between a first position shown in FIG. 12 and a second position shown in FIG. 13. A slot 264 in the member 260 provides clearance for central tube 236 and an actuator handle 266 is affixed to member 260 and projects through an opening 268 in the housing 222 to enable the member 260 to be moved between the first and second positions. Selective movement of the semi-spherical member 260 selectively varies the volume of the manifold 254 at a first location 270 therein relative to the volume at a second location 272 and serves to adjust the flow rate of material from the manifold 254 into the corresponding portions 274 and 276 of the die passage 228, whereby the relative wall thickness is adjusted around the perimeter of the material which emerges from the die passage 228.

It is to be understood that the above detailed description of embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. A cross-head die for use in connection with an extruder to receive material from the extruder and direct the material into a downstream flow wherein the material is conformed to an annular configuration of desired wall thickness, said cross-head die comprising:
   a housing;
   an annular die passage extending axially within the housing, the die passage having an annular inlet, and an outlet axially downstream of the inlet;
   an input passage in the housing, the input passage extending transverse to the direction of the die passage for receiving the material from the extruder and passing the material toward the die passage;
   a manifold in the housing, the manifold communicating with the input passage and having an annular outlet juxtaposed with the annular inlet of the die passage, the manifold further having a given volume at locations along the manifold, the locations communicating with corresponding circumferential portions of the annular inlet of the die passage; and
   means operatively associated with the manifold for selectively varying the volume of the manifold at at least a first of said locations relative to a second of said locations to selectively adjust the relative flow rate of material from the manifold into the corresponding portions of the die passage, whereby the relative wall thickness is selectively adjusted about the periphery of the annular configuration.

2. The invention of claim 1 wherein the manifold has an annular cross-sectional configuration and an axial length, and the means for selectively varying the volume of the manifold includes means operatively associated with the manifold for selectively varying the length of the manifold at said first location relative to the length at said second location.

3. The invention of claim 2 wherein the manifold includes axially opposite annular first and second walls, the first wall being in fixed position within the housing and the second wall being selectively movable relative to the first wall such that the axial distance between the first and second walls may be changed at said first and second locations, and the annular outlet of the manifold is located in one of the first and second walls.

4. The invention of claim 3 wherein:
   the annular outlet of the manifold is located in the first wall;
   the second wall is divided into segments mounted in the housing for axial movement relative to one another; and
   the invention further includes locator means operatively associated with the segments for locating the segments axially in selected positions relative to one another.

5. The invention of claim 4 wherein the locator means includes a plurality of pressure plates hinged to one another and coupled to the segmented second wall, and pressure means operatively associated with the pressure plates for urging the pressure plates toward the segmented wall and maintaining the segments at the selected axial positions.

6. The invention of claim 3 wherein:
   the annular outlet of the manifold is located in the first wall; and
   the invention further includes means mounting the second wall for selective swivelling movement relative to the first wall.

7. The invention of claim 1 wherein:
   the outlet of the die passage includes an outlet passage extending downstream and flaring radially outwardly in a frusto-conical configuration terminating at an annular orifice, the outlet passage having radially inner and outer surfaces;
   said outer surface extending along a sleeve-like member mounted in the housing for axial movement relative to the housing; and
   means operatively associated with the sleeve-like member for selectively moving the sleeve-like member to move the outer surface axially relative to the inner surface and selectively dilate and contract the annular orifice, whereby the wall thickness of the annular configuration of the emerging material will be thickened and thinned, respectively.

8. The invention of claim 7 wherein the means for selectively moving the sleeve-like member includes detector means for detecting the wall thickness of the emerging material and drive means operatively associated with the sleeve-like member and responsive to the detector means for maintaining a selected wall thickness.

9. The invention of claim 1 wherein:
   the outlet of the die passage includes an outlet passage extending downstream and flaring radially outwardly in a frusto-conical configuration terminating at an annular orifice, the outlet passage having radially inner and outer surfaces;

said inner surface extending along a frusto-conical skirt-like member of relatively flexible material mounted in the housing; and means operatively associated with the skirt-like member for selectively flexing the skirt-like member in radial directions to alter the configuration of the inner surface relative to the outer surface, thereby varying the radial spacing between the inner and outer surfaces around the periphery of the orifice, whereby the wall thickness of the annular configuration of the emerging material will be varied correspondingly around the periphery of the emerging material.

10. The invention of claim 9 wherein the means for selectively flexing the skirt-like member includes a radially expandable member mounted within the skirt-like member, the radially expandable member engaging the skirt-like member for radial expansion in limited radial directions.

11. The invention of claim 10 including actuating means coupled to the radially expandable member for selectively expanding and contracting the expandable member.

12. A cross-head die for use in connection with an extruder to receive material from the extruder and direct the material into a downstream flow wherein the material is conformed to an annular configuration of desired wall thickness, said cross-head die comprising:

a housing;

an annular die passage extending axially within the housing, the die passage having an annular inlet, and an outlet axially downstream of the inlet;

an input passage in the housing, the input passage extending transverse to the direction of the die passage for receiving the material from the extruder and passing the material toward the die passage;

a manifold in the housing, the manifold communicating with the input passage and having an annular outlet juxtaposed with the annular inlet of the die passage;

the outlet of the die passage includes an outlet passage extending downstream and flaring radially outwardly in a frusto-conical configuration terminating at an annular orifice, the outlet passage having radially inner and outer surfaces;

said inner surface extending along a frusto-conical skirt-like member of relatively flexible material mounted in the housing; and means operatively associated with the skirt-like member for selectively flexing the skirt-like member in radial directions to alter the configuration of the inner surface relative to the outer surface, thereby varying the radial spacing between the inner and outer surfaces around the periphery of the orifice, whereby the wall thickness of the annular configuration of the emerging material will be varied correspondingly around the periphery of the emerging material.

13. The invention of claim 12 wherein the means for selectively flexing the skirt-like member includes a radially expandable member mounted within the skirt-like member, the radially expandable member engaging the skirt-like member for radial expansion in limited radial directions.

14. The invention of claim 13 including actuating means coupled to the radially expandable member for selectively expanding and contracting the expandable member.

* * * * *